(12) United States Patent
Kuffner et al.

(10) Patent No.: US 12,246,956 B2
(45) Date of Patent: Mar. 11, 2025

(54) PALLET TRUCK

(71) Applicant: CROWN EQUIPMENT CORPORATION, New Bremen, OH (US)

(72) Inventors: Susanne Kuffner, Feldkirchen (DE); Roland Müller, Feldkirchen (DE); Bruce Xia, Jiangsu (CN); Andy Chen, Jiangsu (CN); Martin Ma, Jiangsu (CN); Andrew Pan, Jiangsu (CN); Terry Feng, Jiangsu (CN); Charlie Hu, Jiangsu (CN)

(73) Assignee: Crown Equipment Corporation, New Bremen, OH (US)

( * ) Notice: Subject to any disclaimer, the term of this patent is extended or adjusted under 35 U.S.C. 154(b) by 436 days.

(21) Appl. No.: 17/673,187

(22) Filed: Feb. 16, 2022

(65) Prior Publication Data

US 2023/0131857 A1     Apr. 27, 2023

Related U.S. Application Data

(63) Continuation of application No. PCT/CN2021/125876, filed on Oct. 22, 2021.

(51) Int. Cl.
*B66F 9/22* (2006.01)
*B66F 9/075* (2006.01)
*B66F 9/12* (2006.01)

(52) U.S. Cl.
CPC ............ *B66F 9/22* (2013.01); *B66F 9/07513* (2013.01); *B66F 9/12* (2013.01)

(58) Field of Classification Search
CPC .............. B62B 3/00; B62B 5/06; B66F 9/075
See application file for complete search history.

(56) References Cited

U.S. PATENT DOCUMENTS 8,540,213 B2   9/2013   Feiquan et al.
8,833,736 B2   9/2014   Feiquan et al.
(Continued)

FOREIGN PATENT DOCUMENTS

CN   102030286 A   4/2011
CN   105883681 A   8/2016
(Continued)

OTHER PUBLICATIONS

International Search Report and Written Opinion, International Appln. No. PCT/CN2021/125876, mailed Jun. 24, 2022 (9 pages).

*Primary Examiner* — Diem M Tran
(74) *Attorney, Agent, or Firm* — Dinsmore & Shohl LLP (57) ABSTRACT

A pallet truck includes a drive frame on which a drive wheel support is pivotably supported, a load frame, which is liftable with respect to the drive frame in a lifting direction, and a hydraulic lift module, which interconnects the drive frame and the load frame. The hydraulic lift module includes a hydraulic lift cylinder, which includes a cylinder barrel and a piston rod, wherein the cylinder barrel includes a cap end at one end portion of the cylinder barrel and a rod end at the other end portion of the cylinder barrel, wherein the piston rod extends outwards from the cylinder barrel at the rod end of the cylinder barrel and wherein a free end of the piston rod is accommodated in the drive frame. In the lifting direction, the cap end of the cylinder barrel is arranged above the rod end of the cylinder barrel.

29 Claims, 8 Drawing Sheets

(56) References Cited

U.S. PATENT DOCUMENTS

| | | | |
|---|---|---|---|
| 9,079,754 | B2 | 7/2015 | Feiquan et al. |
| 10,093,336 | B2 * | 10/2018 | Pan ................. B62B 3/0612 |
| 2013/0153840 | A1 | 6/2013 | Feiquan et al. |
| 2015/0102274 | A1 | 4/2015 | He et al. |
| 2021/0053809 | A1 * | 2/2021 | White ................. B66F 9/07572 |

FOREIGN PATENT DOCUMENTS

| | | |
|---|---|---|
| CN | 106966323 A | 7/2017 |
| CN | 108946582 A | 12/2018 |
| CN | 104210517 A | 11/2020 |
| CN | 108455498 A | 11/2020 |
| CN | 108483346 A | 11/2020 |
| CN | 111908379 A | 11/2020 |
| CN | 203332162 U | 11/2020 |
| CN | 206088943 U | 11/2020 |
| CN | 208327281 U | 4/2021 |
| CN | 208856869 U | 4/2021 |
| CN | 208862044 U | 4/2021 |

* cited by examiner

PALLET TRUCK

CROSS-REFERENCE TO RELATED APPLICATION

This application is a bypass continuation application of International Patent Application Ser. No. PCT/CN2021/125876 (CRO 2021 WO) filed Oct. 22, 2021, the entire disclosure of which is hereby incorporated herein by reference.

TECHNICAL FIELD

The present invention relates to a pallet truck. In addition, the present invention relates to a hydraulic lift module.

BACKGROUND

Pallet trucks are widely used, for example in storage facilities. A pallet truck may have a drive for moving the pallet truck along a travel path. An operator may further steer the electric pallet truck along the travel path. The pallet truck may have a drive for lifting goods to be transported along the travel path. The drive for moving the pallet truck and the drive for lifting goods may be powered by a power source, which is arranged on the pallet truck. An arrangement and a configuration of drive components may be relevant for manufacturing, operational reliability and handling of the pallet truck.

Accordingly, it is preferable that the invention at least addresses the foregoing. Preferable features and advantageous characteristics of the invention will become apparent from the general description, the detailed description, the claims and the figures.

SUMMARY

An object of the invention can be seen in providing an improved pallet truck as well as an improved hydraulic lift module.

An aspect of the invention relates to a pallet truck, which may be configured as a low-lift pallet truck. The pallet truck may comprise a drive frame. The drive frame may be a base frame of the pallet truck. The pallet truck may comprise a load frame, which is liftable with respect to the drive frame. The load frame may be a lift frame of the pallet truck. The load frame may be liftable with respect to the drive frame in a lifting direction. The lifting direction may be a substantially vertical direction in operation of the pallet truck in which the pallet truck may be operated on a substantially horizontal working surface. With respect to a driving direction of the drive frame, the lifting direction may be substantially perpendicular to the driving direction. The load frame may be supported on the drive frame. The pallet truck may comprise a linkage, which interconnects the drive frame and the load frame. The linkage may be pivotably connected to the drive frame and the load frame. The linkage may be a rigid connecting member. A drive wheel support may be pivotably supported on the drive frame, wherein a drive wheel of the pallet truck may be in turn rotatably arranged at the drive wheel support. The drive wheel support may be pivotably supported on the drive frame about an upright pivot axis. The drive wheel may be rotatably arranged about a wheel axis. The load frame may further comprise a pair of forks and a lifting mechanism, which may be connected to carrying wheels of the forks for lifting the forks. The pair of forks may be rigidly attached to the load frame. The load frame may thus be configured as a fork carriage, which is liftable with respect to the drive frame. The pair of forks may be configured for engaging a pallet. The load frame may thus be configured for lifting a pallet. According to a further embodiment of the electric pallet truck, the electric pallet truck may further comprise a tiller that is pivotably arranged on the drive frame. The tiller may be connected to the drive wheel via the drive wheel support for steering the pallet truck. The tiller may be operated manually for steering the electric drive wheel unit.

The pallet truck may further comprise a hydraulic lift module, which interconnects the drive frame and the load frame. The hydraulic lift module may support the load frame on the drive frame. The hydraulic lift module may be configured to lift the load frame with respect to the drive frame. The hydraulic lift module may be pivotably connected to the load frame. Alternatively or additionally, the hydraulic lift module may be pivotably connected to the drive frame. The hydraulic lift module may comprise a hydraulic lift cylinder, which comprises a cylinder barrel and a piston rod. The hydraulic lift cylinder may further comprise a piston, which may be guided inside the cylinder barrel, and which may be attached to the piston rod. The cylinder barrel may comprise a cap end at one end portion of the cylinder barrel. The cap end may seal the cylinder barrel at the respective end portion. The cylinder barrel may further comprise a rod end at the other end portion of the cylinder barrel. The piston rod may extend outwards from the cylinder barrel at the rod end of the cylinder barrel. In the lifting direction, the cap end of the cylinder barrel may be arranged above the rod end of the cylinder barrel. The piston rod may extend outwards from the cylinder barrel in the opposite direction to the lifting direction. The piston rod may thus extend downwards and towards the drive frame. The hydraulic lift cylinder may be arranged in an overhead arrangement. The overhead arrangement may be an upside-down arrangement of the hydraulic lift cylinder. A free end of the piston rod may be accommodated in the drive frame. Accordingly, the free end of the piston rod may be accommodated in the drive frame in an arrangement in which the piston rod is not accommodated in the drive wheel support. In said arrangement, a pivot movement of the drive wheel support is not transferred to the piston, which may rest on the drive frame.

The pallet truck may comprise a hydraulic unit, which is hydraulically connected to the hydraulic lift cylinder. The hydraulic unit may be configured to provide and generate a hydraulic fluid flow actuating the hydraulic lift cylinder. The hydraulic unit may comprise a hydraulic pump, which may be operated by a power unit, wherein the hydraulic unit and the power unit may form a power pack for generating the hydraulic fluid flow. The hydraulic unit may comprise a hydraulic reservoir, which stores hydraulic fluid. The hydraulic unit may be configured as a stand-alone system of components for generating the hydraulic fluid flow. The hydraulic unit may comprise an electric hydraulic drive, wherein the hydraulic unit may be configured as an electro-hydraulic unit. The hydraulic unit may be attached to the cylinder barrel. The hydraulic unit may thus be carried on the cylinder barrel. With respect to a lifting movement of the load frame, the hydraulic unit may be movable together with the cylinder barrel in the lifting direction. With respect to the lifting movement, which may be caused by an extraction or retraction of the piston rod, the attachment of the hydraulic unit may thus provide a common movement of the hydraulic unit and the cylinder.

A further aspect of the invention relates to a hydraulic lift module. The hydraulic lift module may be configured as the hydraulic lift module according to the previous aspect. The hydraulic lift module may comprise a hydraulic lift cylinder, which comprises a cylinder barrel and a piston rod. The cylinder barrel may comprise a cap end at one end portion of the cylinder barrel and a rod end at the other end portion of the cylinder barrel, wherein the piston rod extends outwards from the cylinder barrel at the rod end of the cylinder barrel. The hydraulic lift module may comprise a hydraulic unit, which is hydraulically connected to the hydraulic lift cylinder, wherein the hydraulic unit is configured to provide and generate a hydraulic fluid flow actuating the hydraulic lift cylinder. The hydraulic lift module may comprise a bracket, which is attached to the cylinder barrel, wherein the hydraulic unit is attached to the bracket. The hydraulic lift module may comprise at least one component of a hinge, which is arranged at the cap end of the cylinder barrel.

Due to the attachment of the hydraulic unit to the cylinder barrel, a relative movement between the hydraulic unit and the cylinder barrel may be avoided during extraction or retraction of the piston rod. A hydraulic connection, for example a hydraulic pipe connection, between the hydraulic unit and the cylinder barrel may thus be less stressed during extraction and retraction of the piston rod. An advantageous effect of the invention may be an arrangement of robust hydraulic connections of the hydraulic lift module. A further advantageous effect of the invention may be a compact assembly of the hydraulic lift module. At least one of the advantageous effects may be based on the attachment of the hydraulic unit to the cylinder barrel of the hydraulic lift cylinder. The hydraulic lift cylinder, the hydraulic unit, the load frame and the drive frame may provide interactions for lifting the load frame with respect to the drive frame. At least one of the advantageous effects may be a synergetic effect based on such interactions for the purpose of lifting the load frame with respect to the drive frame. A combined system of components may be provided by the hydraulic lift module and the load frame, wherein the system comprises at least one common movement of components in the lifting movement. The common movement may be a vertical movement or a movement in the lifting direction. Based on the combined system and its common movement, a compact and safe operational arrangement of the combined system may be provided with the invention.

According to an embodiment of the invention, the hydraulic unit may be spaced apart from the load frame. The hydraulic unit may only be attached to the cylinder barrel, wherein the hydraulic unit is not attached, in particular not directly attached, to the load frame. A separate arrangement of the electric hydraulic unit with respect to the load frame may provide a modular arrangement of the electric hydraulic unit and additional mounting space on the load frame for further operational components of the electric pallet truck. According to an embodiment of the invention, the hydraulic lift module may comprise a bracket, which is attached to the cylinder barrel. The hydraulic unit may be attached to the bracket. The bracket may clasp or embrace the hydraulic unit. The bracket may be configured as a protective cover that partly covers electric hydraulic unit. The bracket may interconnect the cylinder barrel and the hydraulic unit. The cylinder barrel and the hydraulic unit may thus be separate components of the hydraulic lift module. The cylinder barrel and the hydraulic unit may be arranged such that they are spaced apart from each other. Accordingly and advantageously, maintenance or single replacement of the cylinder barrel or the hydraulic unit within the hydraulic lift module may thus be enabled and facilitated. According to a further embodiment of the invention, the cylinder barrel may comprise a mounting tab, which extends from the cylinder barrel. The bracket may be attached to the mounting tab. The mounting tab may be integrally formed, for example welded, with the cylinder barrel. The hydraulic unit may be attached to the mounting tab. The mounting tab may provide a predefined mounting position of the hydraulic unit with respect to the cylinder barrel. Additionally or alternatively, the bracket may provide the mounting position. Accordingly and advantageously, mounting of the hydraulic unit to the cylinder barrel may be further performed efficiently for assembly, maintenance or replacement.

According to a further embodiment of the invention, the bracket may comprise a cylinder attachment portion, which is attached to the cylinder barrel and a hydraulic unit attachment portion to which the hydraulic unit is attached. The cylinder attachment portion may be attached to the mounting tab. The bracket may comprise an elbow, which interconnects the cylinder attachment portion and the hydraulic unit attachment portion. The bracket may thus comprise a bent shape, wherein the bracket may be alternatively bent or cast in shape. The elbow may provide a space-saving attachment of the hydraulic unit to the cylinder barrel. The bracket may further provide a tight attachment of the hydraulic unit to the cylinder barrel. According to a further embodiment of the invention, the bracket may be detachably attached to the cylinder barrel. The bracket may be detachably attached to the mounting tab. Accordingly and advantageously, an efficient assembly, maintenance and replacement may be further improved. According to a further embodiment of the invention, the hydraulic unit may be detachably attached to the bracket. Based thereon, the efficient assembly, maintenance and replacement may be further improved.

According to a further embodiment of the invention, the cylinder barrel may comprise an inner thread at the other end portion of the cylinder barrel. The cap end may be screwed in the inner thread of the cylinder barrel. The cap end may comprise an external thread, which is screwed in the inner thread of the cylinder barrel. The cylinder barrel may further comprise a counter-nut, which is screwed to the external thread. The counter-nut may provide an anti-loose function. The screwed arrangement of the cap end may provide a compact size of the cylinder barrel saving mounting space in the overall arrangement of components of the pallet truck. Further advantageously, the cylinder barrel may be machined from a seamless tube, which may require less machining and effort compared to a solid bar. The cap end may further comprise a sealing, which is arranged between the cap end and the cylinder barrel for sealing the cylinder barrel. The cap end may be configured as a stroke stop, which defines a minimum stroke of the hydraulic lift cylinder, and which abuts on the piston of the hydraulic lift cylinder in a retracted condition of the hydraulic lift cylinder. The cap end may thus provide an inner hard stop for a minimum stroke of the hydraulic lift cylinder. According to a further embodiment of the invention, the piston rod may comprise a lateral rod extension, which abuts against an inner surface of the cylinder barrel in an extended condition of the hydraulic lift cylinder and thereby limits a maximum stroke of the hydraulic lift cylinder in the extended condition of the hydraulic lift cylinder. The cylinder barrel may thus comprise an internal stop, which limits the stroke of the hydraulic lift cylinder. The hydraulic lift cylinder may be configured without a lift limit sensor, which may increase the durability of the pallet truck and may further reduce maintenance effort. The inner surface of the cylinder barrel may be arranged in a hydraulic chamber of the hydraulic cylinder. The inner surface may be configured as a stroke stop, which defines a maximum stroke of the hydraulic lift cylinder. The inner surface may thus provide an inner hard stop for a maximum stroke of the hydraulic lift cylinder. Accordingly, a component arrangement may be improved.

According to a further embodiment of the invention, a hinge may be arranged at the cap end of the cylinder barrel. The hinge may interconnect the cylinder barrel and the load frame. The hinge may provide a relative pivotable movement of the cylinder barrel with respect to the load frame or vice versa when the load frame is lifted with respect to the drive frame. The hinge may comprise a pin joint or a ball joint. According to a further embodiment of the invention, the hinge may comprise a pin and at least one eye, which provides movability of the pin. The pin may be accommodated in the eye, wherein the pin may be pivotably accommodated or fixed within the eye. According to a further embodiment of the invention, an eye that accommodates the pin may be arranged in the cap end of the cylinder barrel. The pin may be pivotably accommodated or fixed within the eye. According to a further embodiment of the invention, the hinge may comprise a lever, which is pivotably connected to the cap end of the cylinder barrel. The lever may be attached to the load frame. The pin may pivotably interconnect the cap end with the lever. The lever may comprise an eye in which the pin may be accommodated. The pin may be pivotably accommodated or fixed within the eye. Accordingly and advantageously, the hinge may provide an efficient mechanism for reducing adverse impacts on components of the pallet truck, for example stresses or loads, when the load frame is lifted with respect to the drive frame. Due to the hinge, the hydraulic lift module may be configured to lift the load frame while simultaneously allowing a relative movement between the hydraulic lift cylinder and the load frame. The relative movement may be a compensation movement between the cylinder barrel and the load frame, which may be caused by a swivelling movement of the load frame when being lifted. Conceivably, the hydraulic lift module may be less stressed compared to a respective stiff arrangement and operation of the hydraulic lift module may thus require less maintenance and cost. In addition, the hydraulic lift module may be more durable.

According to a further embodiment of the invention, the hydraulic lift cylinder may be configured as a single-acting cylinder. A lowering of the load frame may be due to gravity acting on the single-acting cylinder. The lowering of the load frame may thus be due to the load of the load frame acting on the single-acting cylinder. According to a further embodiment of the invention, the pallet truck may further comprise a hydraulic line, which hydraulically connects the hydraulic unit to a hydraulic chamber of the cylinder barrel. The hydraulic chamber may be the hydraulic chamber of the hydraulic lift cylinder. The hydraulic line may comprise a hydraulic pipe, for example a metal pipe. Such a rigid hydraulic connection may be enabled based on the attachment of the hydraulic unit to the cylinder barrel. Accordingly and advantageously, less maintenance of the hydraulic lift module may thus be required and a higher durability of the hydraulic lift module may thus be provided.

According to a further embodiment of the invention, the pallet truck may comprise a hydraulic cylinder connector, which hydraulically interconnects the hydraulic line and the hydraulic chamber of the cylinder barrel. The hydraulic cylinder connector may extend from the cylinder barrel along an angled path. The hydraulic cylinder connector may provide a tight arrangement of the hydraulic line to the cylinder barrel. The angled path of the hydraulic connector may at least partly follow an L-shape or an S-shape. The angled path may allow the hydraulic line to be at least partly aligned to the cylinder axis of the cylinder barrel. According to a further embodiment of the invention, a length of the hydraulic line may be shorter than an axial length of the cylinder barrel. A path section of the hydraulic line without substantial bending may provide a compact hydraulic connection. According to a further embodiment of the invention, the hydraulic cylinder port, which hydraulically interconnects the hydraulic unit and the cylinder barrel, may be arranged in a cylinder periphery of the cylinder barrel. The hydraulic port may be arranged in a mantle surface of the cylinder barrel. The hydraulic cylinder port may be spaced apart from the cap end of the cylinder barrel. The length of the hydraulic line may thus be reduced. Accordingly and advantageously, the hydraulic line may thus be arranged in a space-saving manner avoiding collisions with further components.

According to a further embodiment of the invention, a free end of the piston rod may be mounted in the drive frame, in particular fixedly mounted in the drive frame. The free end of the piston rod may be rigidly connected to the drive frame. The free end of the piston rod may comprise a mounting groove for engagement with a mounting member of the drive frame. The free end of the piston rod may comprise a fixation member, for example a fixation groove, for mounting the free end of the piston rod in the drive frame. A relative movement of the hydraulic cylinder and the drive frame may thus be avoided to reduce bending stresses during a lifting of the load frame. According to a further embodiment of the invention, the free end of the piston rod, which protrudes from the cylinder barrel, comprises a mounting recess. The mounting recess may be engaged by a mounting member for mounting the free end of the piston rod in the drive frame. The mounting member may further engage the drive frame or be part of the drive frame.

According to a further embodiment of the invention, in an axial direction with respect to a cylinder axis of the hydraulic lift cylinder, the hydraulic unit and the cylinder barrel may be arranged offset with respect to each other. In the axial direction, the cylinder barrel may at least partly extend beyond the hydraulic unit. Occupancy of mounting space adjacent to the cylinder barrel by the hydraulic unit may thus be avoided. The hydraulic unit may thus be arranged adjacent to the piston rod. Accordingly and advantageously, occupancy of mounting space adjacent to the cylinder barrel may thus be avoided for providing this mounting space for further operational components of the pallet truck.

According to a further embodiment of the invention, the drive frame may comprise a drive seat, which accommodates a bearing of the drive wheel support. The drive frame may further comprise a cylinder seat, which accommodates the piston rod. In a radial direction with respect to the cylinder axis of the hydraulic lift cylinder, the drive seat and the cylinder seat may be arranged offset with respect to each other. The cylinder seat may be arranged vertically and/or horizontally offset with respect to the drive seat and vice versa. The drive seat and the cylinder seat may be arranged spaced apart from each other on the drive frame. The cylinder seat may be arranged on a support arm that projects from the drive seat. The support arm may project towards the load frame. The cylinder seat may be arranged horizontally offset in direction towards the load frame. The arrangement of the cylinder seat towards the load frame may provide an arrangement of the hydraulic lift cylinder and the hydraulic unit adjacent or inside the load frame. The cylinder seat may be arranged lower on the drive frame than the drive seat. According to a further embodiment of the invention, a rod support surface, which supports the free end of the piston rod, may be arranged vertically offset with respect to the bearing support surface of the drive seat. According to a further embodiment of the invention, in the axial direction with respect to the cylinder axis of the hydraulic lift cylinder, the cylinder seat may be arranged below the drive seat. An arrangement of the hydraulic lift cylinder and the hydraulic unit together with the center of gravity of the electric pallet truck may thus be shifted downwards. Accordingly and advantageously, a lower center of gravity of the electric pallet truck may increase operational safety. Further accordingly and advantageously, an offset arrangement of the cylinder seat with respect to the drive seat may provide free operational space above the drive seat.

According to a further embodiment of the invention, the pallet truck may further comprise a cover, which is arranged on the load frame. The cover may be arranged to at least one open side of the load frame. The cover and the load frame may enclose an inner mounting space. The hydraulic lift module may at least partly be arranged inside the inner mounting space. The hydraulic lift cylinder and/or the hydraulic unit may at least partly be arranged inside the inner mounting space. The inner mounting space may be spanned by the load frame and/or the cover. The inner mounting space may be spanned by a convex hull of the load frame and/or the cover. The inner mounting space may be enclosed by the load frame and/or the cover. The load frame may comprise at least two frame parts, which span the inner mounting space between those frame parts. The cover may comprise at least one cover part, which spans the inner mounting space. Due to the attachment of the hydraulic unit to the cylinder barrel, all operational components of the hydraulic unit may be arranged at least partly inside the inner mounting space while not being attached to the load frame. The hydraulic lift cylinder may thus be integrated into the load frame. Accordingly and advantageously, moving parts of the hydraulic lift module may thus not be exposed to the operator of the electric pallet truck.

According to a further embodiment of the invention, the pallet truck may further comprise a battery pack, which is electrically connectable to the hydraulic unit. The battery pack may be at least partly insertable into the inner mounting space. The battery pack may comprise at least one accumulator. The battery pack may at least be partly arranged inside the inner mounting space. The battery pack may be arranged laterally offset with respect to a longitudinal axis of the electric pallet truck. The longitudinal axis of the electric pallet truck may extend through the hydraulic lift cylinder. According to a further embodiment of the invention, the pallet truck may further comprise a charger, which is electrically connectable to the battery pack, wherein the charger may be arranged inside the inner mounting space. The charger may at least be partly arranged inside the inner mounting space. The charger may further be arranged laterally offset with respect to the longitudinal axis of the electric pallet truck. The battery pack and the charger may be arranged at opposite portions of the inner mounting space that may be divided horizontally by the longitudinal axis. According to a further embodiment of the invention, the pallet truck may further comprise a controller, which is configured and connected with the hydraulic unit for controlling the latter. The battery pack may be electrically connectable to the controller and to the hydraulic unit via the controller. The controller may at least be partly arranged inside the inner mounting space. The controller may be arranged in the portion of the inner mounting space that is arranged opposite to the portion of the inner mounting space in which the battery is arranged. An opposite arrangement of the charger and/or controller with respect to the battery pack may provide a center of gravity of the electric pallet truck that is balanced and on or close to the longitudinal axis.

Additional features and advantages may be gleaned by the person skilled in the art from the following description of exemplary embodiments with respect to the appended figures. The embodiments as shown and described are exemplary embodiments only and shall not be construed as limiting the invention, which is defined by the appended claims.

BRIEF DESCRIPTION OF THE DRAWINGS

Embodiments of the present invention will hereinafter be further described in conjunction with the following figures, wherein like numerals denote like elements.

DETAILED DESCRIPTION

Figure 1:
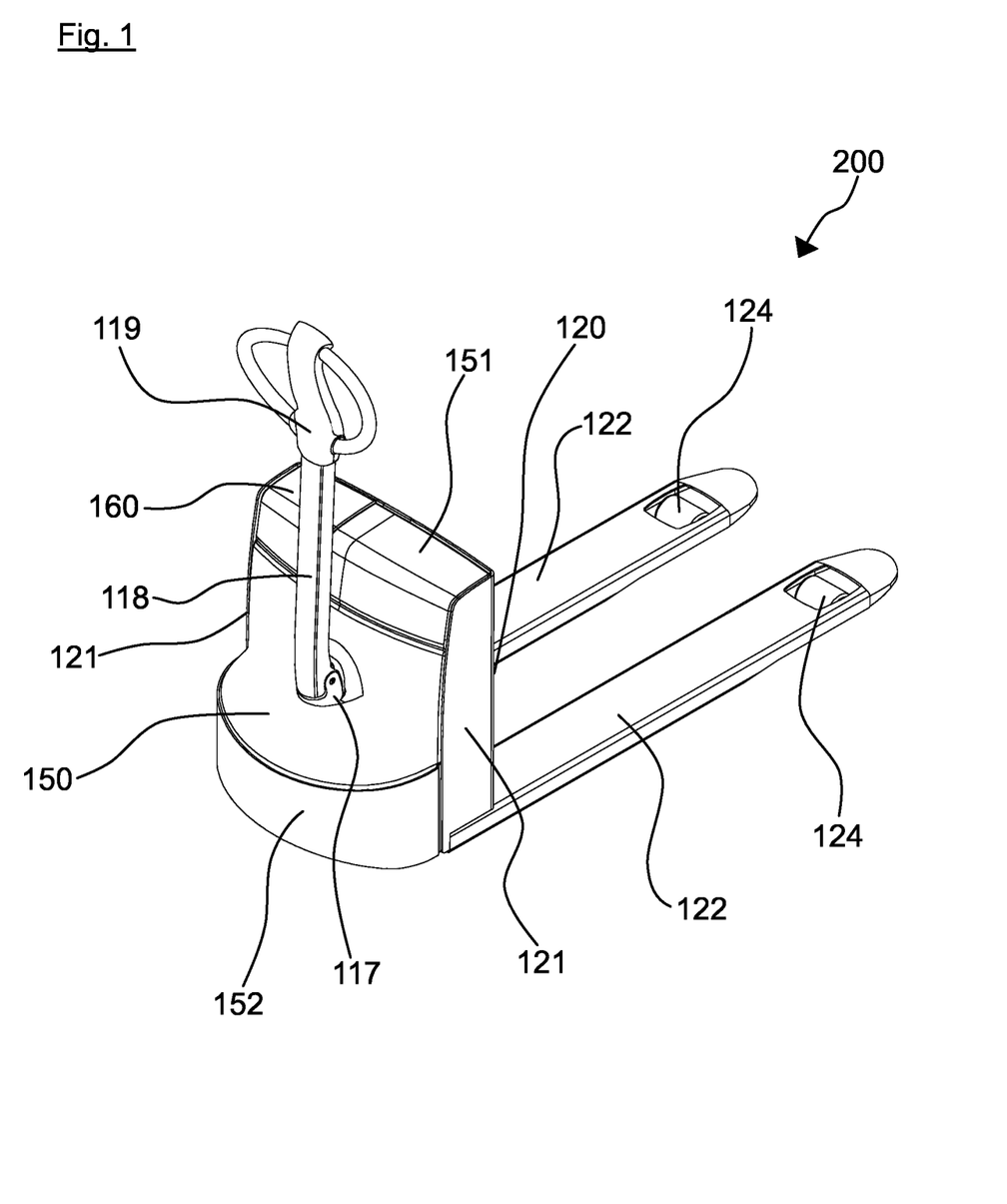
FIG. 1 shows a pallet truck according to an embodiment of the invention in a perspective view.

FIG. 1 shows a pallet truck 200 in a perspective view. The pallet truck 200 is configured as a low-lift pallet truck. The pallet truck 200 comprises a load frame 120, which is liftable. The pallet truck 200 further comprises a pair of forks 122, which is arranged at the load frame 120. The pair of forks 122 is mounted on a bottom part of the load frame 120. The pair of forks 122 is configured to engage a pallet. At a front portion of the pair of forks 122, which is opposite to an attachment portion of the pair of forks 122, carrying wheels 124 are arranged.

Figure 6:
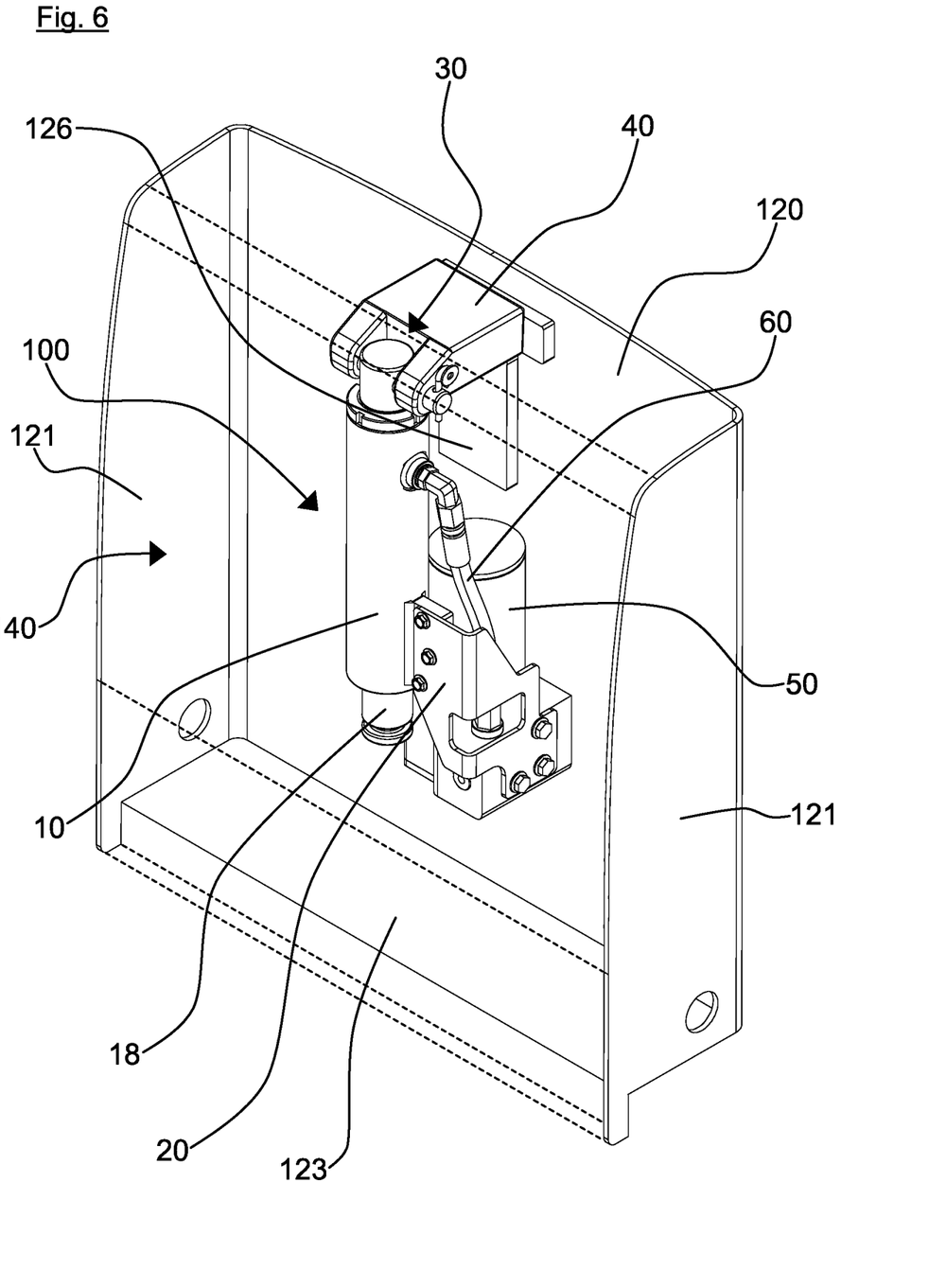
FIG. 6 shows the hydraulic lift module in an exposed arrangement in the load frame according to an embodiment of the invention.

The load frame 120 may comprise lateral frame parts 121, wherein the load frame 120 may have a horizontal section, which may have a U-shape. A lateral open side of the load frame 120 may be covered by a cover 150, which is arranged on the load frame 120. The load frame 120 and the cover 150 may enclose an inner mounting space 140, which is shown in FIG. 6. The cover 150 may be arranged flush with the lateral frame parts 121. The pallet truck 200 may further comprise a skirt 152, which covers a drive unit 131 of the pallet truck 200, shown in FIG. 2. The skirt 152 may be arranged flush with the cover 150. The pallet truck 200 may further comprise an upper cover part 151, which further covers the load frame 120 at a top open side of the load frame 120. The upper cover part 151 may be arranged flush with the cover 150 and the lateral frame parts 121.

Figure 2:
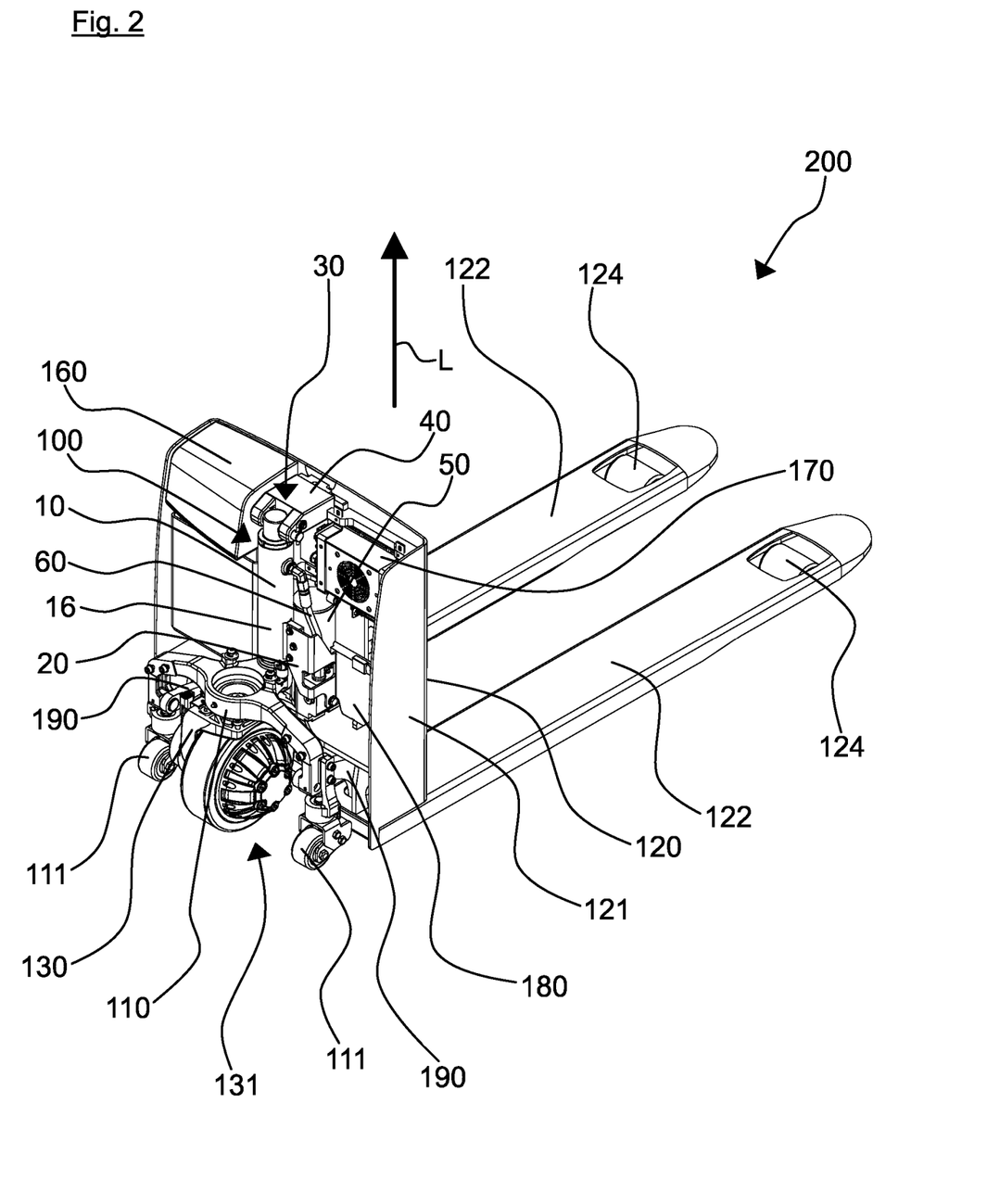
FIG. 2 shows the pallet truck of FIG. 1 with a hydraulic lift module according to a further embodiment of the invention in a perspective view.
Figure 7:
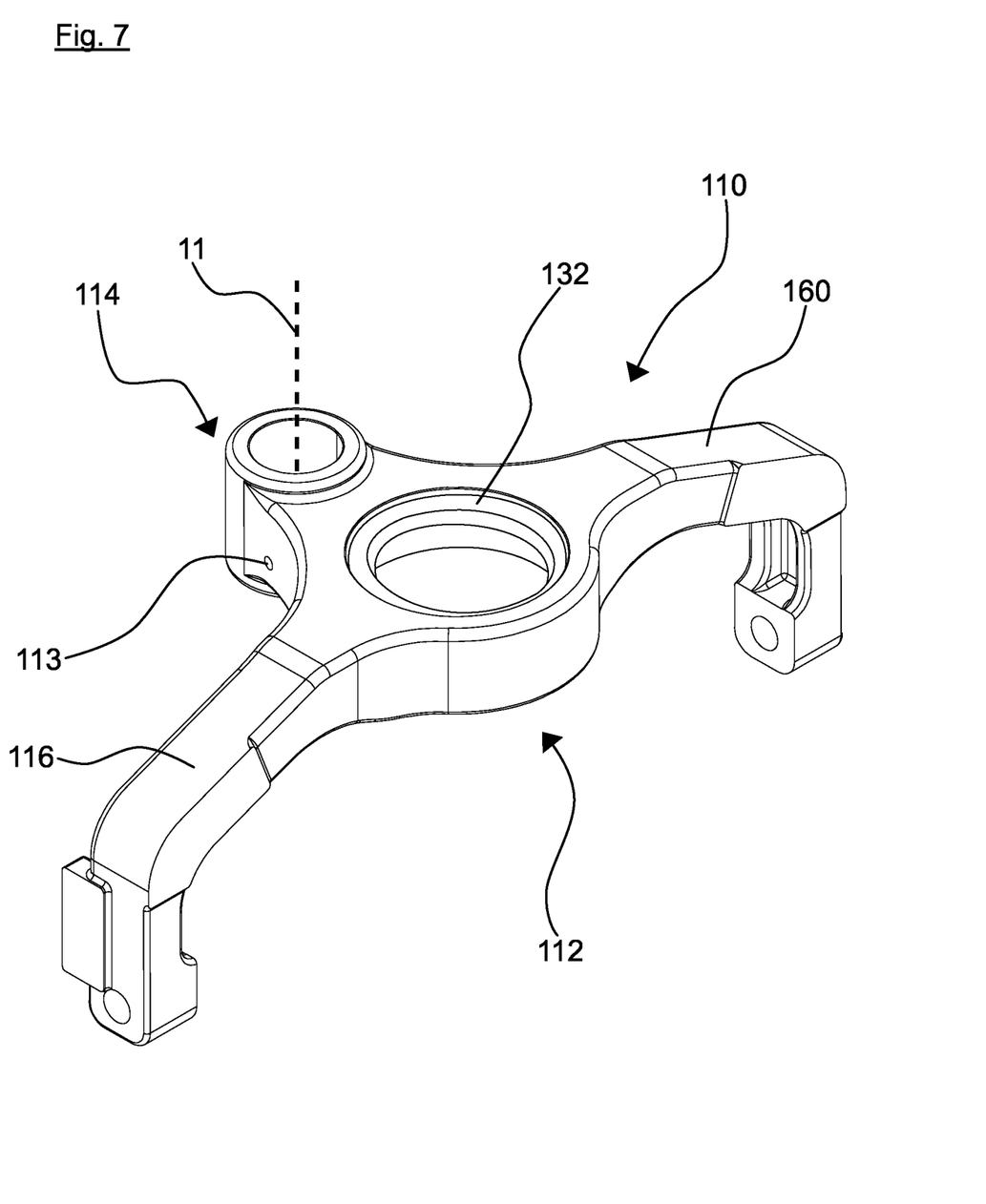
FIG. 7 shows a drive frame of the pallet truck of FIG. 1 in a perspective view.

The pallet truck 200 further comprises a drive frame 110, shown in FIG. 2 and FIG. 7 on which a tiller joint 117 is arranged. The tiller joint 117 connects a tiller 118 for steering the pallet truck 200 with a drive unit 131, shown in FIG. 2. A tiller head 119 for manually steering the pallet truck 200 is attached to a distal end of the tiller 118 opposite to a proximal end of the tiller 118, which is pivotably articulated with the tiller joint 117. The pallet truck 200 further comprises a battery pack 160, which is arranged at the load frame 120. The battery pack 160 may be arranged in the inner mounting space 140 of the load frame 120.

FIG. 2 shows the pallet truck 200 from FIG. 1 in the perspective view without the cover 150, the skirt 152, the upper cover part 151 and the tiller 118. The pallet truck 200 further comprises a controller 180, which is configured to control a lifting of the load frame 120. The controller 180 may be configured to control the drive unit 131 for driving the pallet truck 200. The pallet truck 200 further comprises a charger 170, which is configured to charge the battery pack 160, wherein the charger 170 may be electrically connected to the battery pack. The battery pack 160 may provide an energy source for lifting the load frame 120 with respect to the drive frame 110 and for driving the pallet truck 200 with the drive unit 131. The pallet truck 200 may further comprise stabilizing wheels 111, which are attached to the drive frame 110. The pallet truck 200 further comprises a drive wheel support 130, which is pivotably supported on the drive frame 110. The drive unit 131 in turn is rotatably supported on the drive wheel support 130. The drive unit 131 may comprise a respective rotation axis.

The pallet truck 200 further comprises a hydraulic lift module 100, which interconnects the drive frame 110 and the load frame 120. The controller 180 may be configured to control the hydraulic lift module 100 for lifting the load frame 120 with respect to the drive frame 110. The hydraulic lift module 100, which is shown in detail in FIG. 4, comprises a hydraulic lift cylinder 10, which interconnects the drive frame 110 and the load frame 120. The hydraulic lift cylinder 10 is arranged in an upside-down arrangement. The hydraulic lift module 100 further comprises a hydraulic unit 50, which is hydraulically connected to the hydraulic lift cylinder 10 via a hydraulic line 60. The hydraulic unit 50 is configured to provide and generate a hydraulic fluid flow through the hydraulic line 60, which actuates the hydraulic lift cylinder 10. The battery pack 160 is electrically connected to the hydraulic unit 50. The hydraulic unit 50 is attached to the hydraulic lift cylinder 10, wherein the hydraulic unit 50 is attached to a cylinder barrel 16 of the hydraulic lift cylinder 10. The hydraulic lift module 100 further comprises a bracket 20, which is attached to the cylinder barrel 16 of the hydraulic lift cylinder 10, wherein the hydraulic unit 50 is attached to the bracket 20. The hydraulic lift cylinder 10 is connected to a lever 40, which interconnects the load frame 120 and the hydraulic lift cylinder 10. The lever 40 may be part of the load frame 120. The hydraulic lift module 100 may further comprise a hinge 30, which interconnects the load frame 120 and the hydraulic lift cylinder 10, wherein the hinge 30 may interconnect the cylinder barrel 16 and the load frame 120. The hinge 30 may be configured as a pivot joint, which allows a pivot movement of the load frame 120 with respect to the lift cylinder 10 and vice versa.

Figure 3:
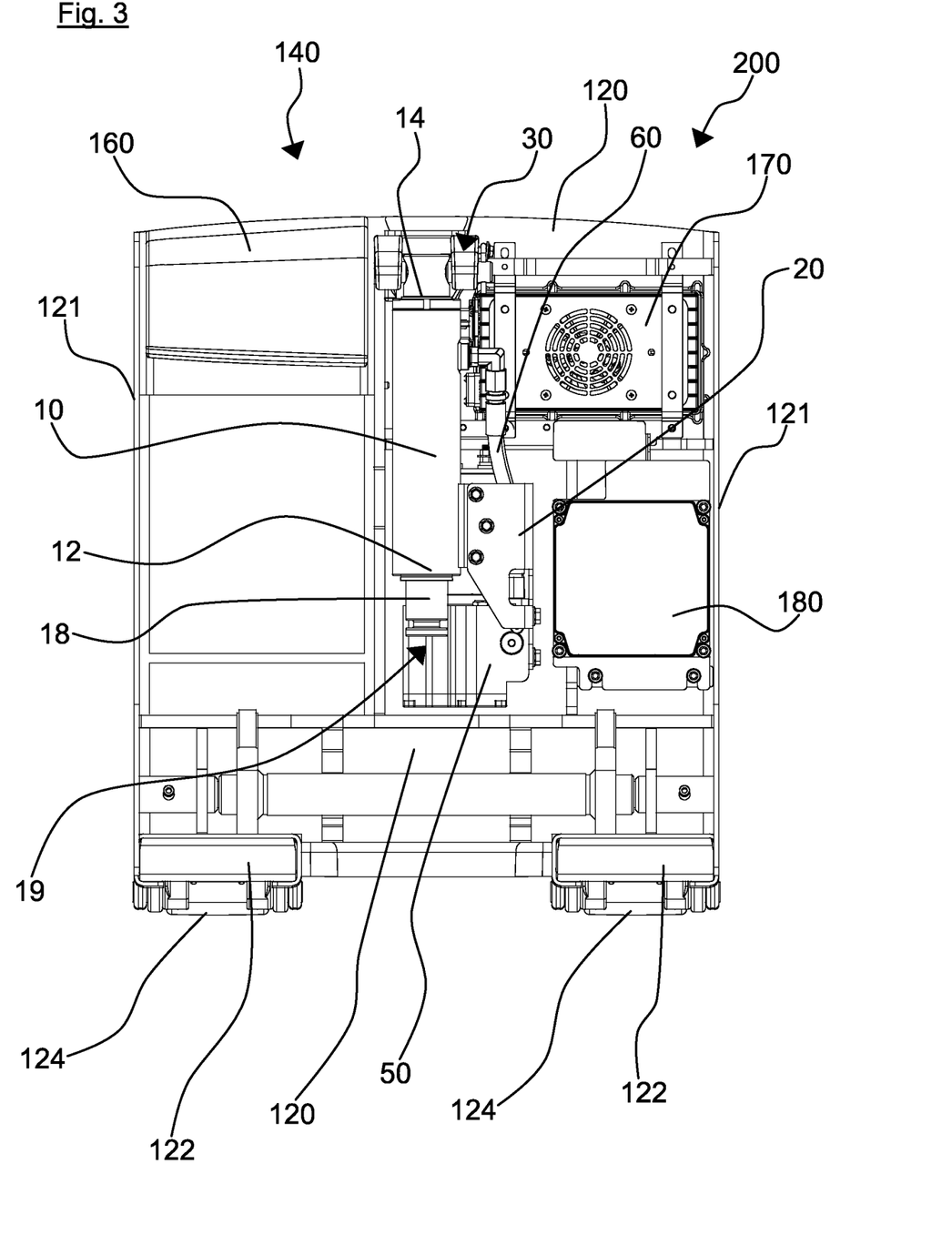
FIG. 3 shows a load frame of the pallet truck of FIG. 1 with the hydraulic lift module in a side view.

FIG. 3 shows the load frame 120 in a side view. The hydraulic lift cylinder 10 may be arranged along a central axis of the load frame 120 in the vertical direction. The hydraulic lift cylinder 10 may be arranged in the lifting direction L of the load frame 120 with respect to the drive frame 110, shown in FIG. 2. The hydraulic lift cylinder 10, which is arranged in an upside-down arrangement, comprises a cap end 14, which is connected to the hinge 30. The hinge 30 may be arranged at the cap end 14. In the lifting direction L, the cap end 14 is arranged above the rod end 12. The hydraulic lift cylinder 10 further comprises a piston rod 18, which extends outwards from the cylinder barrel 16 of the hydraulic lift cylinder 10 at a rod end 12 of the hydraulic lift cylinder 10. The rod end 12 is arranged opposite to the cap end 14 on the cylinder barrel 16. The free end 19 of the piston rod 18 is accommodated in the drive frame 110. When lifting the load frame 120 with respect to the drive frame 110, the free end 19 of the piston rod 18 abuts against the drive frame 110.

The battery pack 160 is arranged in a side portion of the load frame 120. The controller 180 and/or the charger 170 is arranged in a side portion of the load frame 120, which may be an opposite portion with respect to the side portion of the load frame 120 in which the battery pack 160 is arranged. The hydraulic lift cylinder 10 may be arranged in between the battery pack 160 and the controller 180 and/or the charger 170. The hydraulic unit 50 may be arranged between the hydraulic lift cylinder 10 and the load frame 120.

Figure 4:
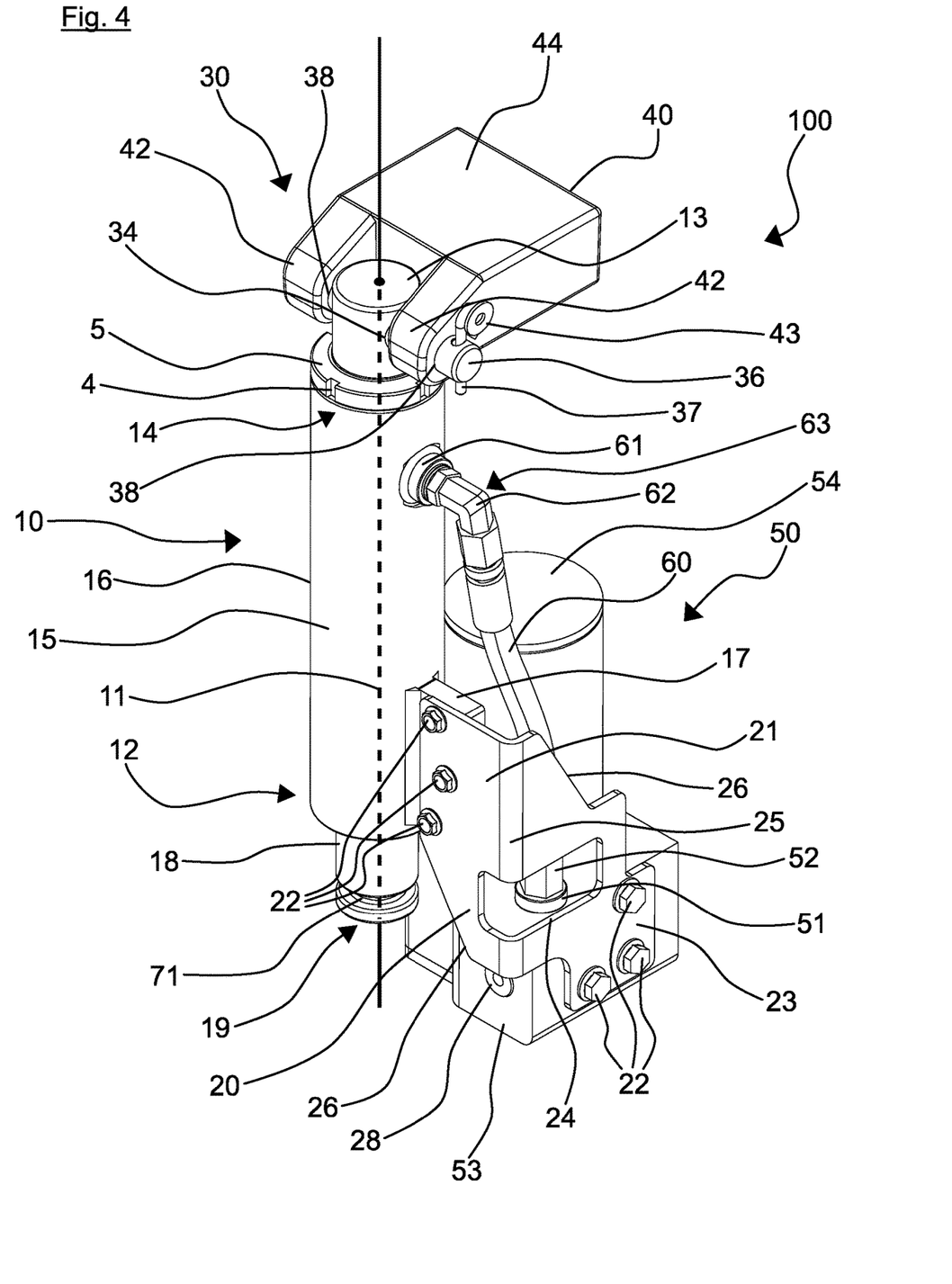
FIG. 4 shows the hydraulic lift module in an isolated view.

FIG. 4 shows the hydraulic lift module 100. The hydraulic lift module 100 comprises the hydraulic lift cylinder 10, the hydraulic unit 50, the hydraulic pipe 60 and the hinge 30. The hydraulic lift module 100 may further comprise the lever 40. The hydraulic unit 50 may comprise a control connection 28 for a control input of the controller 180 to control a lifting of the load frame 120.

The hydraulic lift cylinder 10 comprises a cylinder barrel 16 and the piston rod 18. The cylinder barrel 16 comprises the cap end 14 at one end portion of the cylinder barrel 16 and the rod end 12 at the other end portion of the cylinder barrel 16. The hydraulic lift cylinder 10 further comprises a cylinder axis 11, which may be arranged in an upright orientation according to an operational condition of the hydraulic lift module 100. The operational condition of the hydraulic lift module 100 may be a condition of the hydraulic lift module 100 in operation of the hydraulic lift module 100 in the pallet truck 200. The operational condition may thus be a respective working condition or mounting condition of the hydraulic lift module 100. The upright orientation of the cylinder axis 11 may be a vertical orientation of the cylinder axis 11 according to the operational condition of the hydraulic lift module 100. In an axial direction with respect to the cylinder axis 11, the hydraulic unit 50 and the cylinder barrel 16 may be arranged offset with respect to each other.

The cap end 14 closes the cylinder barrel 16 at one end thereof. With respect to the operational condition, the cap end 14 closes the top end of the cylinder barrel 16. The piston rod 18 extends outwards from the cylinder barrel 16 at the rod end 12 of the cylinder barrel 16, which is opposite to the cap end 14. The piston rod 18 extends outwards from the cylinder barrel 16 at the rod end 12 of the cylinder barrel 16. With respect to the operational condition, the piston rod 18 may protrude and extend outwards from the lower end of the cylinder barrel 16, wherein the piston rod 18 may protrude downwards.

The cap end 14 comprises an elongation that axially extends from the cylinder barrel 16 with respect to the cylinder axis 11. The elongation may comprise a spacer bolt 13, which extends from the cylinder barrel 16. The elongation or the spacer bolt 13 may be axially aligned with the cylinder axis 11. The elongation or the spacer bolt 13 may comprise an eye 34, which penetrates the elongation or the spacer bolt 13. The eye 34 may penetrate the elongation or the spacer bolt 13 perpendicular to the cylinder axis 11.

The hinge 30 may comprise the elongation or the spacer bolt 13. The hinge 30 may further comprise a pin 36 and the lever 40. The pin 36 may be pivotably accommodated in the eye 34, wherein the pin 36 may extend two-sided from the eye 34. The lever 40 may be pivotably connected to the elongation or to the spacer bolt 13. The lever 40 may be pivotably connected to the cap end 14 via the elongation or to the spacer bolt 13. The lever 40 may comprise two arms 42, which extend from a main body 44 of the lever 40. Each arm 42 may comprise a lug 38, which may be a further eye of the hinge 30. The pin 36 may extend two-sided through both lugs 38, wherein the pin 36 may be pivotably accommodated two-sided in both lugs 38. Alternatively, the pin 36 may be fixed two-sided in both lugs 38, for example with a press-fit arrangement. The pin 36 may be secured with a locking pin 37. The locking pin 37 may penetrate the pin 36 at one end thereof, which extends beyond one of the arms 42. The locking pin 37 may be further secured to the lever 40, for example hooked on the lever 40 at a detent 43, which may be arranged on the lever 40. In the operational condition of the hydraulic lift module 100, the lever 40 may be attached to the load frame 120 of the pallet truck 200.

The piston rod 18 comprises a free end 19 thereof, which is exposed, and which is arranged outside of the cylinder barrel 16. The free end 19 comprises a mounting recess 71, which may be configured as a peripheral groove. The mounting recess 71 may be arranged radially on the free end 19. In the operational condition, the peripheral groove 71 may function as a fixation groove for fixing the free end 19 of the piston rod 18 to the drive frame 110 of the pallet truck 200. In the operational condition, the piston rod 18 may thus be fixed to the drive frame 110. The piston rod 18 is extendable and retractable from the cylinder barrel 16. In the operational condition, the free end 19 may abut or engage with the drive frame 110. An extension or retraction of the piston rod 18 may thus cause a movement of the cylinder barrel 16 with respect to the drive frame 110 in the operational condition.

The cylinder barrel 16 may comprise a mounting tab 17, which may be integrally formed with the cylinder barrel 16. The mounting tab 17 radially extends from the cylinder barrel with respect to the cylinder axis 11. The mounting tab 17 may be welded with the cylinder barrel 16. The bracket 20 may comprise a bent or angled shape. The bracket 20 may comprise a cylinder attachment portion 21, which is attached to the cylinder barrel 16 and a hydraulic unit attachment portion 23 to which the hydraulic unit 50 is attached. The bracket 20 may further comprise an elbow 25, which interconnects the cylinder attachment portion 21 and the hydraulic unit attachment portion 23. The bracket 20 may be attached to the mounting tab 17. The bracket 20 may be detachably screwed to the mounting tab 17 with, for example, at least two screws 22. The angled bracket 20 may comprise an L-shaped profile or may be in a right-angled shape. The hydraulic unit 50 may be attached to the bracket 20. The hydraulic unit 50 may be detachably screwed to the bracket 20 with, for example, at least two further screws 22. The hydraulic unit 50 may be attached to the bracket 20 at the hydraulic unit attachment portion 23, which is angled with respect to the cylinder attachment portion 21. The attachment portion 21 is attached to the mounting tab 17. The bracket 20 may further comprise an opening 24, which is arranged in at least one of the portions 21, 23. The opening 24 may extend over both portions 21, 23, wherein the opening 24 may extend over the elbow 25, which divides both portions 21, 23. The hydraulic unit attachment portion 23 may further comprise an angled edge 26.

The hydraulic unit 50 may be configured for hydraulically actuating the hydraulic lift cylinder 10 and for extracting and retracting the piston rod 18. The hydraulic unit 50 may comprise a pump body 54 and a fluid reservoir 53. Therefore, the electric hydraulic unit 50 may be hydraulically connected with the cylinder barrel 16 via the hydraulic line 60. The hydraulic line 60 may be connected to the cylinder barrel 16 with a hydraulic cylinder connector 62. The hydraulic line 60 may be connected to the hydraulic unit 50 with a hydraulic unit connector 52. The hydraulic line 60 and the hydraulic chamber 3 of the cylinder barrel 16 may be interconnected with a hydraulic cylinder connector 62, wherein the hydraulic cylinder connector 62 may extend from the cylinder barrel 16 along an angled path 63. The hydraulic cylinder connector 62 may be an L-shaped hydraulic cylinder connector 62. The hydraulic cylinder connector 62 may be connected to a hydraulic cylinder port 61, which is arranged on the cylinder barrel 16. The hydraulic unit connector 52 may be connected to a hydraulic unit port 51, which is arranged on hydraulic unit 50. The hydraulic line 60 may be a rigid hydraulic pipe, for example a metal pipe. The hydraulic line 60 may extend in alignment with the cylinder axis 11. The hydraulic cylinder port 61 may be arranged spaced apart from the cap end 14 on the cylinder barrel 16. The hydraulic cylinder port 61 may thus be arranged at a middle portion of the cylinder barrel 16.

Figure 5:
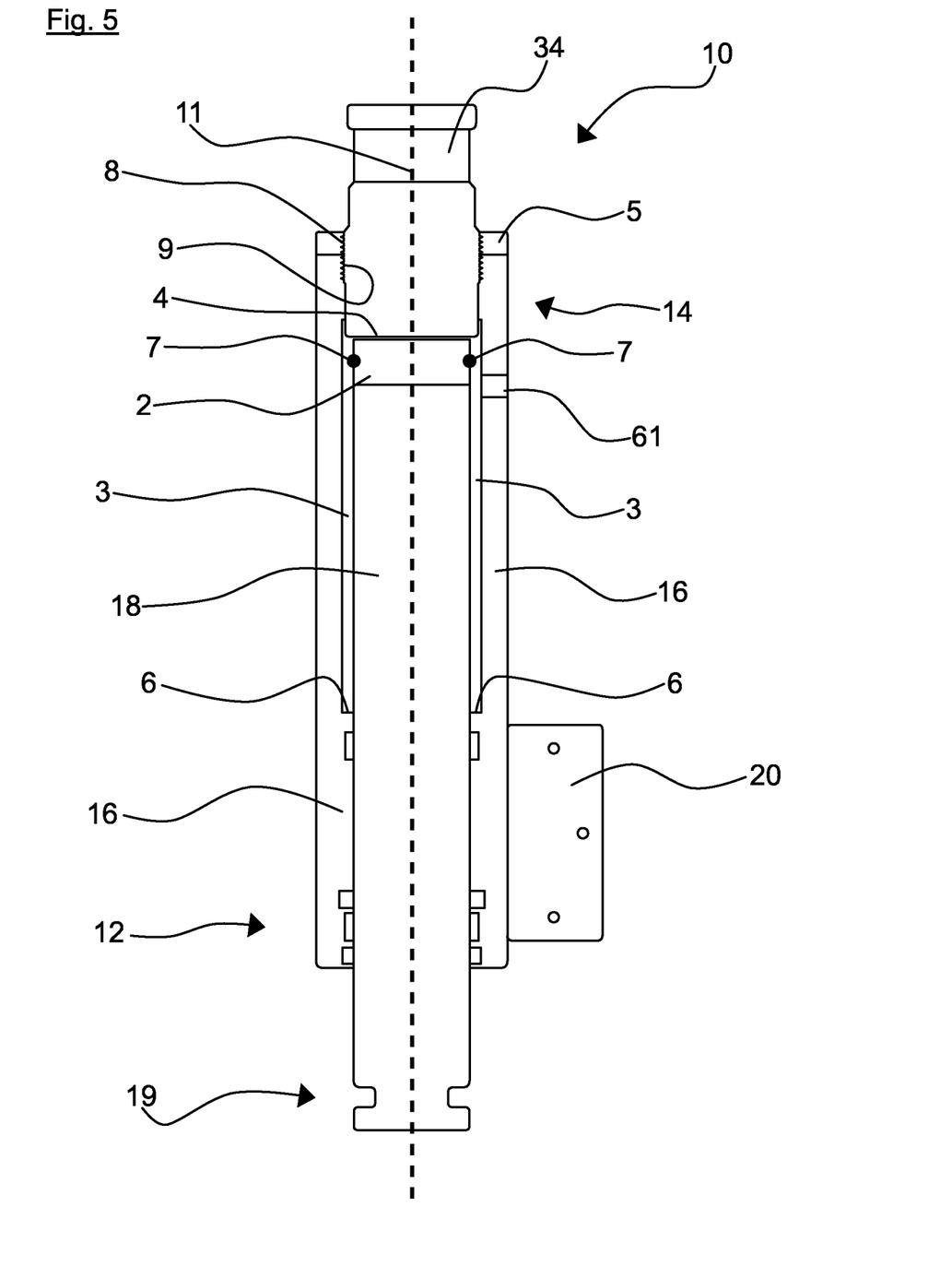
FIG. 5 shows a sectional view of a hydraulic lift cylinder of the hydraulic lift module.

FIG. 5 shows the hydraulic lift cylinder 10 in a sectional view. In the section shown, the hydraulic lift cylinder 10 is cut through the cylinder axis 11. In FIG. 5, a retracted condition of the hydraulic lift cylinder 10 is shown in which the piston rod 18 has a minimum stroke. The hydraulic cylinder 10 may be configured as a single-acting cylinder with cylinder port 61 arranged in the cylinder barrel 16. In the retracted condition, a piston 2 of the hydraulic lift cylinder 10, which is arranged in a hydraulic chamber 3 of the hydraulic lift cylinder 10, abuts against the cap end 14. In the retracted condition, the piston 2 abuts against an end face 4 of the cap end 14, which faces the piston 2. Abutment of the piston 2 against the end face 4 defines and limits the minimum stroke in a hard stop arrangement. The hard stop arrangement may be gravity-induced based on a load acting from the load frame 120. A retracted length of the hydraulic cylinder 10 may thus be limited.

The cylinder barrel 16 comprises an inner thread 9, which is arranged at the cap end 14. The cap end 14 comprises an outer thread 8, which is screwed in the inner thread 9 of the cylinder barrel 16. The hydraulic lift cylinder 10 further comprises a counternut 5, which is screwed to the outer thread 8 of the cap end 14 in a screwed-in arrangement of the cap end 14 being screwed in the cylinder barrel 16. The counternut 5 abuts the cylinder barrel 16 and secures the screwed-in arrangement of the cap end 14. The counternut 5 may further provide a fixed angular arrangement between the cap end 14 and the cylinder barrel 16.

In an extended condition of the hydraulic lift cylinder 10, the piston 2 or the piston rod 18 abuts against an inner surface 6 of the cylinder barrel 16. The inner surface 6 is arranged on the hydraulic chamber 3 and may extend in a radial direction with respect to the cylinder axis 11. The piston rod 18 comprises a lateral rod extension 7, which may be a ring member attached to the peripheral surface of the piston rod 18. The piston rod 18 may comprise a peripheral groove in which the ring member may be attached, which may be a snap-ring. The lateral rod extension 7 abuts against the inner surface 6 of the cylinder barrel 16 in the extended condition of the hydraulic lift cylinder 10. Abutment of lateral rod extension 7 against the inner surface 6 defines and limits the maximum stroke of the hydraulic lift cylinder 10 in the extended condition of the hydraulic lift cylinder 10. An extended length of the hydraulic cylinder 10 may thus be limited.

FIG. 6 shows the hydraulic lift module 100 in an exposed arrangement in the load frame 120. The load frame 120 comprises an inner mounting space 140, which is at least partly enclosed by the load frame 120 and the cover 150, shown in FIG. 1. The hydraulic lift module 100 is at least partly arranged in the inner mounting space 140. Accordingly, the hydraulic lift cylinder 10, the bracket 20, the hydraulic unit 50, the hydraulic line 60, the hinge 30 and/or the lever 40 may be at least partly arranged in the inner mounting space 140. The lever 40 and/or the hinge 30 may be attached to the load frame 120 via a mounting plate 126, which may interconnect the load frame 120 and the lever 40 and/or the hinge 30. The piston rod 18 may be at least partly arranged in the inner mounting space 140, wherein the piston rod 18 may not leave the inner mounting space 140 while being extracted.

The inner mounting space 140 may be spanned by the outer contour of the load frame 120 as indicated in FIG. 6 with dashed lines. The inner mounting space 140 may be further spanned by at least one of the lateral frame parts 121, which may laterally limit the load frame 120 and the inner mounting space 140, respectively. The inner mounting space 140 may be further spanned by a bottom frame part 123, which may further limit the load frame 120 and the inner mounting space 140, respectively, downwards in the operational condition of the pallet truck 200. The inner mounting space 140 may be defined by the convex hull of the load frame 120, further indicated by said dashed lines. The battery pack 160 as shown in FIG. 3 is at least partly insertable into the inner mounting space 140, wherein the battery pack 160 may be arranged in the inner mounting space 140. The charger 170 as shown in FIG. 3 may be at least partly arranged in the inner mounting space 140.

Figure 8:
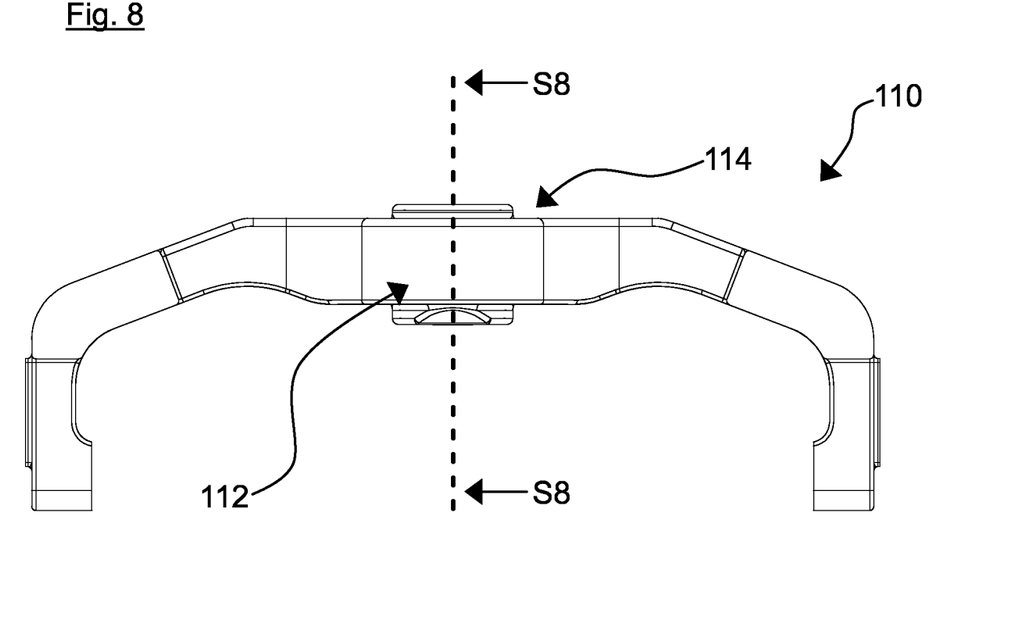
FIG. 8 shows the drive frame of FIG. 7 in a side view.

FIG. 7 and FIG. 8 shows the drive frame 110 of the pallet truck 200 in a perspective with an isolated view of the drive frame 110. The drive frame 110 comprises a drive seat 112, which accommodates a bearing 132 of the drive wheel support 130, shown in FIG. 2. The bearing 132 is arranged on an inner protrusion 133 of the drive seat 112, shown in FIG. 9. The drive frame 110 further comprises a cylinder seat 114, which accommodates the piston rod 18. The drive seat 112 and the cylinder seat 114 are spaced apart from each other. The cylinder seat 114 may be cup-shaped as further shown in FIG. 9. Accordingly, in a radial direction with respect to the cylinder axis 11 of the hydraulic lift cylinder 10, the drive seat 112 and the cylinder seat 114 may be spaced apart from each other. In the radial direction with respect to the cylinder axis 11 of the hydraulic lift cylinder 10, the drive seat 112 and the cylinder seat 114 may be arranged offset with respect to each other. The drive frame 110 may be integrally formed, wherein the cylinder seat 114 may be welded with the drive seat. The drive frame 110 may further comprise a traverse 116, which is connected to a lifting mechanism 190. The lifting mechanism 190 is connected to the carrying wheels 124 of the pair of forks 122 for lifting the load frame 120 with respect to the drive frame 110.

Figure 9:
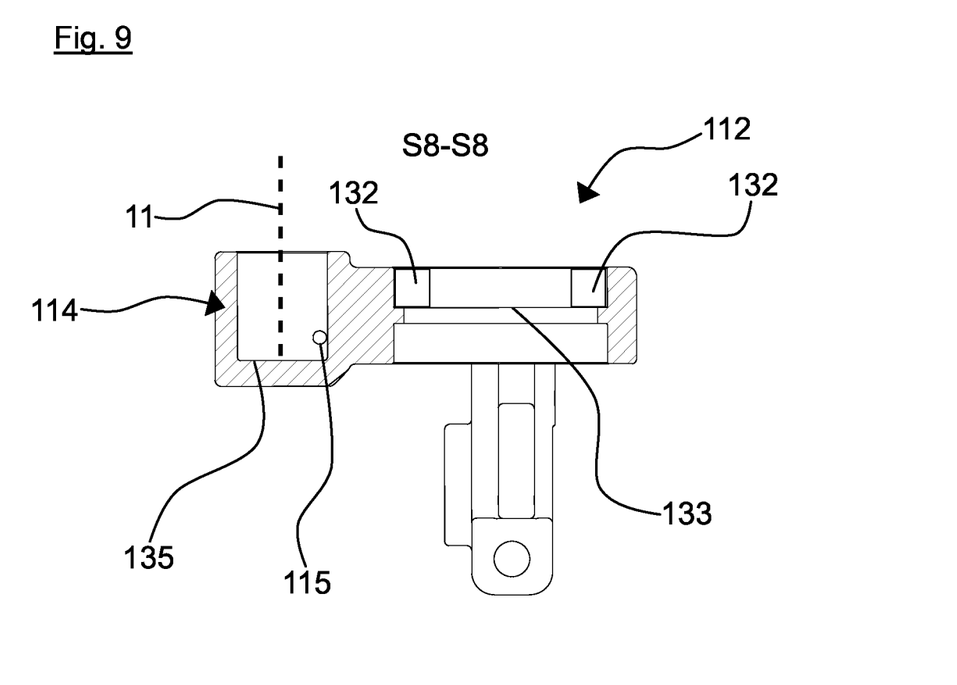
FIG. 9 shows the drive frame of FIG. 7 in a sectional view.

The cylinder seat 114 further comprises a through hole 113, which may be configured as a countersunk hole. FIG. 9 shows a mounting member, which may be configured as an engaging pin, which engages the mounting recess 71 of the free end 19 of the piston rod 18. Based on such an engagement of the mounting member 115 with the mounting recess 71, the piston rod 18 may be fixedly mounted in the cylinder seat 114 of the drive frame 110.

FIG. 9 shows a sectional view S8-S8 of an upright section as indicated in FIG. 8. The section S8-S8 of FIG. 8 cuts the drive frame 110 through the cylinder seat 114 and the drive seat 112. In the axial direction with respect to the cylinder axis 11 of the hydraulic lift cylinder 10, the cylinder seat 114 may be arranged below the drive seat 112. A level of the cylinder seat 114 may be defined by the bottom 135 of the cylinder seat 114. A level of the drive seat 112 may be defined by the inner protrusion 133. Accordingly, said bottom 135 may be arranged lower than said protrusion in the operational condition.

The invention claimed is:

1. A pallet truck, comprising:
   a drive frame on which a drive wheel support is pivotably supported,
   a load frame, which is liftable with respect to the drive frame in a lifting direction, and
   a hydraulic lift module, which interconnects the drive frame and the load frame, wherein the hydraulic lift module comprises:
   a hydraulic lift cylinder, which comprises a cylinder barrel and a piston rod, wherein the cylinder barrel comprises a cap end at one end portion of the cylinder barrel and a rod end at the other end portion of the cylinder barrel, wherein the piston rod extends outwards from the cylinder barrel at the rod end of the cylinder barrel and wherein a free end of the piston rod is accommodated in the drive frame, wherein, in the lifting direction, the cap end of the cylinder barrel is arranged above the rod end of the cylinder barrel,
   a hydraulic unit, which comprises a pump body that is hydraulically connected to the hydraulic lift cylinder, wherein the hydraulic unit is configured to provide and generate a hydraulic fluid flow actuating the hydraulic lift cylinder, and
   a bracket, which interconnects to the cylinder barrel and the pump body, wherein movement of the cylinder barrel results in a corresponding movement of the pump body.

2. The pallet truck according to claim 1,
   wherein the bracket is attached to the cylinder barrel, and wherein the hydraulic unit is attached to the bracket.

3. The pallet truck according to claim 2,
   wherein the cylinder barrel comprises a mounting tab, which extends from the cylinder barrel,
   wherein the bracket is attached to the mounting tab.

4. The pallet truck according to claim 2,
   wherein the bracket comprises a cylinder attachment portion, which is attached to the cylinder barrel and a hydraulic unit attachment portion to which the hydraulic unit is attached,
   wherein the bracket comprises an elbow, which interconnects the cylinder attachment portion and the hydraulic unit attachment portion.

5. The pallet truck according to claim 2,
   wherein the bracket is detachably attached to the cylinder barrel.

6. The pallet truck according to claim 2,
   wherein the hydraulic unit is detachably attached to the bracket.

7. The pallet truck according to claim 1,
   wherein the cylinder barrel comprises an inner thread at the other end portion of the cylinder barrel, and wherein the cap end is screwed in the inner thread of the cylinder barrel.

8. The pallet truck according to claim 1, wherein a hinge is arranged at the cap end of the cylinder barrel, and
wherein the hinge interconnects the cylinder barrel and the load frame.

9. The pallet truck according to claim 8, wherein the hinge comprises a pin and at least one eye, which provides movability of the pin.

10. The pallet truck according to claim 9, wherein an eye, which accommodates the pin, is arranged in the cap end of the cylinder barrel.

11. The pallet truck according to claim 8, wherein the hinge comprises a lever, which is pivotably connected to the cap end of the cylinder barrel.

12. The pallet truck according to claim 1, wherein the hydraulic lift cylinder is configured as a single-acting cylinder.

13. The pallet truck according to claim 1, further comprising:
a hydraulic line, which hydraulically connects the hydraulic unit to a hydraulic chamber of the cylinder barrel.

14. The pallet truck according to claim 13, further comprising:
a hydraulic cylinder connector, which hydraulically interconnects the hydraulic line and the hydraulic chamber of the cylinder barrel,
wherein the hydraulic cylinder connector extends from the cylinder barrel along an angled path.

15. The pallet truck according to claim 1, wherein a hydraulic cylinder port, which hydraulically interconnects the hydraulic unit and the cylinder barrel, is arranged in a cylinder periphery of the cylinder barrel.

16. The pallet truck according to claim 1, wherein the piston rod comprises a lateral rod extension, which abuts against an inner surface of the cylinder barrel in an extended condition of the hydraulic lift cylinder and thereby limits a maximum stroke of the hydraulic lift cylinder in the extended condition of the hydraulic lift cylinder.

17. The pallet truck according to claim 1, wherein a free end of the piston rod is fixedly mounted in the drive frame.

18. The pallet truck according to claim 1, wherein, in an axial direction with respect to a cylinder axis of the hydraulic lift cylinder, the hydraulic unit and the cylinder barrel are arranged offset with respect to each other.

19. The pallet truck according to claim 18, wherein the drive frame comprises a drive seat, which accommodates a bearing of the drive wheel support,
wherein the drive frame further comprises a cylinder seat, which accommodates the piston rod, and
wherein, in a radial direction with respect to the cylinder axis of the hydraulic lift cylinder, the drive seat and the cylinder seat are arranged offset with respect to each other.

20. The pallet truck according to claim 19, wherein, in the axial direction with respect to the cylinder axis of the hydraulic lift cylinder, the cylinder seat is arranged below the drive seat.

21. The pallet truck according to claim 1, further comprising:
a cover, which is arranged on the load frame,
wherein the cover and the load frame enclose an inner mounting space, and
wherein the hydraulic lift module is arranged inside the inner mounting space.

22. The pallet truck according to claim 21, further comprising:
a battery pack, which is electrically connectable to the hydraulic unit,
wherein the battery pack is at least partly insertable into the inner mounting space.

23. The pallet truck according to claim 22, further comprising:
a charger, which is electrically connectable to the battery pack,
wherein the charger is arranged in the inner mounting space.

24. The pallet truck according to claim 1, wherein a free end of the piston rod, which protrudes from the cylinder barrel, comprises a mounting recess.

25. A hydraulic lift module, comprising:
a hydraulic lift cylinder, which comprises a cylinder barrel and a piston rod, wherein the cylinder barrel comprises a cap end at one end portion of the cylinder barrel and a rod end at the other end portion of the cylinder barrel, wherein the piston rod extends outwards from the cylinder barrel at the rod end of the cylinder barrel,
a hydraulic unit, which comprises a pump body that is hydraulically connected to the hydraulic lift cylinder, wherein the hydraulic unit is configured to provide and generate a hydraulic fluid flow actuating the hydraulic lift cylinder,
a bracket, which interconnects the cylinder barrel and the pump body, wherein movement of the cylinder barrel results in a corresponding movement of the pump body, and
at least one component of a hinge, which is arranged at the cap end of the cylinder barrel.

26. A pallet truck, comprising:
a drive frame on which a drive wheel support is pivotably supported,
a load frame, which is liftable with respect to the drive frame in a lifting direction, and
a hydraulic lift module, which interconnects the drive frame and the load frame, wherein the hydraulic lift module comprises:
a hydraulic lift cylinder, which comprises a cylinder barrel and a piston rod, wherein the cylinder barrel comprises a cap end at one end portion of the cylinder barrel and a rod end at the other end portion of the cylinder barrel, wherein the piston rod extends outwards from the cylinder barrel at the rod end of the cylinder barrel and wherein a free end of the piston rod is accommodated in the drive frame,
wherein, in the lifting direction, the cap end of the cylinder barrel is arranged above the rod end of the cylinder barrel, and
a hydraulic unit, which is hydraulically connected to the hydraulic lift cylinder, wherein the hydraulic unit is configured to provide and generate a hydraulic fluid flow actuating the hydraulic lift cylinder,
wherein the hydraulic unit is attached to the cylinder barrel,
wherein the cylinder barrel comprises an inner thread at the other end portion of the cylinder barrel, and
wherein the cap end is screwed in the inner thread of the cylinder barrel.

27. A pallet truck, comprising:
a drive frame on which a drive wheel support is pivotably supported,
a load frame, which is liftable with respect to the drive frame in a lifting direction, and
a hydraulic lift module, which interconnects the drive frame and the load frame, wherein the hydraulic lift module comprises:
a hydraulic lift cylinder, which comprises a cylinder barrel and a piston rod, wherein the cylinder barrel comprises a cap end at one end portion of the cylinder barrel and a rod end at the other end portion of the cylinder barrel, wherein the piston rod extends outwards from the cylinder barrel at the rod end of the cylinder barrel and wherein a free end of the piston rod is accommodated in the drive frame,
wherein, in the lifting direction, the cap end of the cylinder barrel is arranged above the rod end of the cylinder barrel, and
a hydraulic unit, which is hydraulically connected to the hydraulic lift cylinder, wherein the hydraulic unit is configured to provide and generate a hydraulic fluid flow actuating the hydraulic lift cylinder,
wherein the hydraulic unit is attached to the cylinder barrel, and
wherein the piston rod comprises a lateral rod extension, which abuts against an inner surface of the cylinder barrel in an extended condition of the hydraulic lift cylinder and thereby limits a maximum stroke of the hydraulic lift cylinder in the extended condition of the hydraulic lift cylinder.

28. A pallet truck, comprising:
a drive frame on which a drive wheel support is pivotably supported,
a load frame, which is liftable with respect to the drive frame in a lifting direction, and
a hydraulic lift module, which interconnects the drive frame and the load frame, wherein the hydraulic lift module comprises:
a hydraulic lift cylinder, which comprises a cylinder barrel and a piston rod, wherein the cylinder barrel comprises a cap end at one end portion of the cylinder barrel and a rod end at the other end portion of the cylinder barrel, wherein the piston rod extends outwards from the cylinder barrel at the rod end of the cylinder barrel and wherein a free end of the piston rod is accommodated in the drive frame,
wherein, in the lifting direction, the cap end of the cylinder barrel is arranged above the rod end of the cylinder barrel, and
a hydraulic unit, which is hydraulically connected to the hydraulic lift cylinder, wherein the hydraulic unit is configured to provide and generate a hydraulic fluid flow actuating the hydraulic lift cylinder,
wherein the hydraulic unit is attached to the cylinder barrel,
wherein, in an axial direction with respect to a cylinder axis of the hydraulic lift cylinder, the hydraulic unit and the cylinder barrel are arranged offset with respect to each other,
wherein the drive frame comprises a drive seat, which accommodates a bearing of the drive wheel support,
wherein the drive frame further comprises a cylinder seat, which accommodates the piston rod, and
wherein, in a radial direction with respect to the cylinder axis of the hydraulic lift cylinder, the drive seat and the cylinder seat are arranged offset with respect to each other.

29. The pallet truck according to claim 28,
wherein, in the axial direction with respect to the cylinder axis of the hydraulic lift cylinder, the cylinder seat is arranged below the drive seat.

* * * * *